United States Patent
Blain et al.

(10) Patent No.: US 9,446,659 B1
(45) Date of Patent: Sep. 20, 2016

(54) INTEGRATED CHASSIS HEATSINK FOR ELECTRIC VEHICLES

(71) Applicant: Faster Faster Inc., Brisbane, CA (US)

(72) Inventors: Christopher Charles Blain, Sausalito, CA (US); Jeff Waldo Sand, San Francisco, CA (US); Derek Albert Dorresteyn, Mill Valley, CA (US)

(73) Assignee: Faster Faster Inc., Brisbane, CA (US)

( * ) Notice: Subject to any disclaimer, the term of this patent is extended or adjusted under 35 U.S.C. 154(b) by 0 days.

(21) Appl. No.: 15/209,549

(22) Filed: Jul. 13, 2016

Related U.S. Application Data

(63) Continuation of application No. 14/753,718, filed on Jun. 29, 2015, now Pat. No. 9,415,673.

(60) Provisional application No. 62/019,000, filed on Jun. 30, 2014.

(51) Int. Cl.
*B60K 11/04* (2006.01)

(52) U.S. Cl.
CPC .................................... *B60K 11/04* (2013.01)

(58) Field of Classification Search
CPC ....... B60K 11/00; B60K 11/02; B60K 11/04; B60K 11/08
See application file for complete search history.

(56) References Cited

U.S. PATENT DOCUMENTS

| | | | |
|---|---|---|---|
| 6,326,765 B1 * | 12/2001 | Hughes | B60L 11/1801 320/104 |
| 7,255,191 B2 * | 8/2007 | Baldwin | B62K 11/10 180/220 |
| 8,212,438 B2 * | 7/2012 | Belton | B62K 11/04 310/52 |
| 2008/0131764 A1 * | 6/2008 | Saiki | H01M 2/1083 429/149 |

* cited by examiner

*Primary Examiner* — John Walters
*Assistant Examiner* — James Triggs
(74) *Attorney, Agent, or Firm* — Fenwick & West LLP

(57) ABSTRACT

A chassis for an electric vehicle is disclosed that functions as a heat sink to cool an electric motor and motor controller of the electric vehicle. The chassis includes one or more tubes that are connected to an inner surface of the chassis. As coolant fluid flows through the tubes, heat from the coolant is dissipated into the chassis.

20 Claims, 9 Drawing Sheets

INTEGRATED CHASSIS HEATSINK FOR ELECTRIC VEHICLES

CROSS-REFERENCE TO RELATED APPLICATIONS

This application is a continuation of U.S. patent application Ser. No. 14/753,718 filed on Jun. 29, 2015 which claims the benefit of U.S. Provisional Patent Application No. 62/019,000, filed on Jun. 30, 2014, each of which is incorporated by reference in its entirety.

BACKGROUND

1. Field of Technology

The embodiments herein relate generally to cooling electric vehicle components. More particularly, the embodiments herein relate to cooling an electric motor and motor controller of an electric vehicle.

2. Description of the Related Art

Both internal combustion engines and electric motors generate heat as a byproduct of operation. Vehicles with internal combustion engines typically circulate a coolant fluid around the engine and through a radiator in order to efficiently eliminate the generated heat from the engine. Internal combustion engines operate at a relatively low efficiency (approximately 30%) and thus generate a large amount of heat during operation. A coolant fluid circulated through a radiator is often the most efficient method of eliminating the quantity of heat generated by an internal combustion engine. On the other hand, electric vehicle components are relatively efficient (approximately 95%), and therefore do not generate as much heat during operation compared to the heat generated by a comparable internal combustion engine. Therefore, a smaller quantity of heat must be eliminated from electric vehicle components relative to a comparable internal combustion engine. Thus, a radiator system may not be the most efficient method of eliminating heat from an electric vehicle.

SUMMARY

Fluid is circulated around an electric motor and motor controller of an electric vehicle to cool the electric motor and motor controller. The heat absorbed by the fluid is transferred to the chassis of the electric motorcycle, which acts as a heat sink. Electric vehicles output significantly less heat than a comparable internal combustion engine powered vehicle, and thus using the chassis as a heat sink provides ample heat elimination capability. Using the chassis as a heat sink advantageously eliminates the need for a complex radiator system, resulting in reduced points of failure and reduced overall vehicle mass. Additionally, incorporating the motor controller housing into the chassis reduces the overall complexity of the coolant system and also reduces vehicle mass.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Similar to vehicles powered by internal combustion engines (ICE), vehicles powered by electric motors generate heat. In order to prevent the electric motor and various other components of the electric vehicle from overheating, the generated heat must be eliminated from certain components of the electric vehicle. In some embodiments, the electric motor generates heat that must be eliminated from the electric motor. In other embodiments, the controller or other components also generate heat, and therefore need to have heat removed as well. Although the following figures and embodiments are described with respect to an electric motorcycle such as an electric motorcycle, various other embodiments comprise other vehicles or applications such as electric cars.

Figure 1:
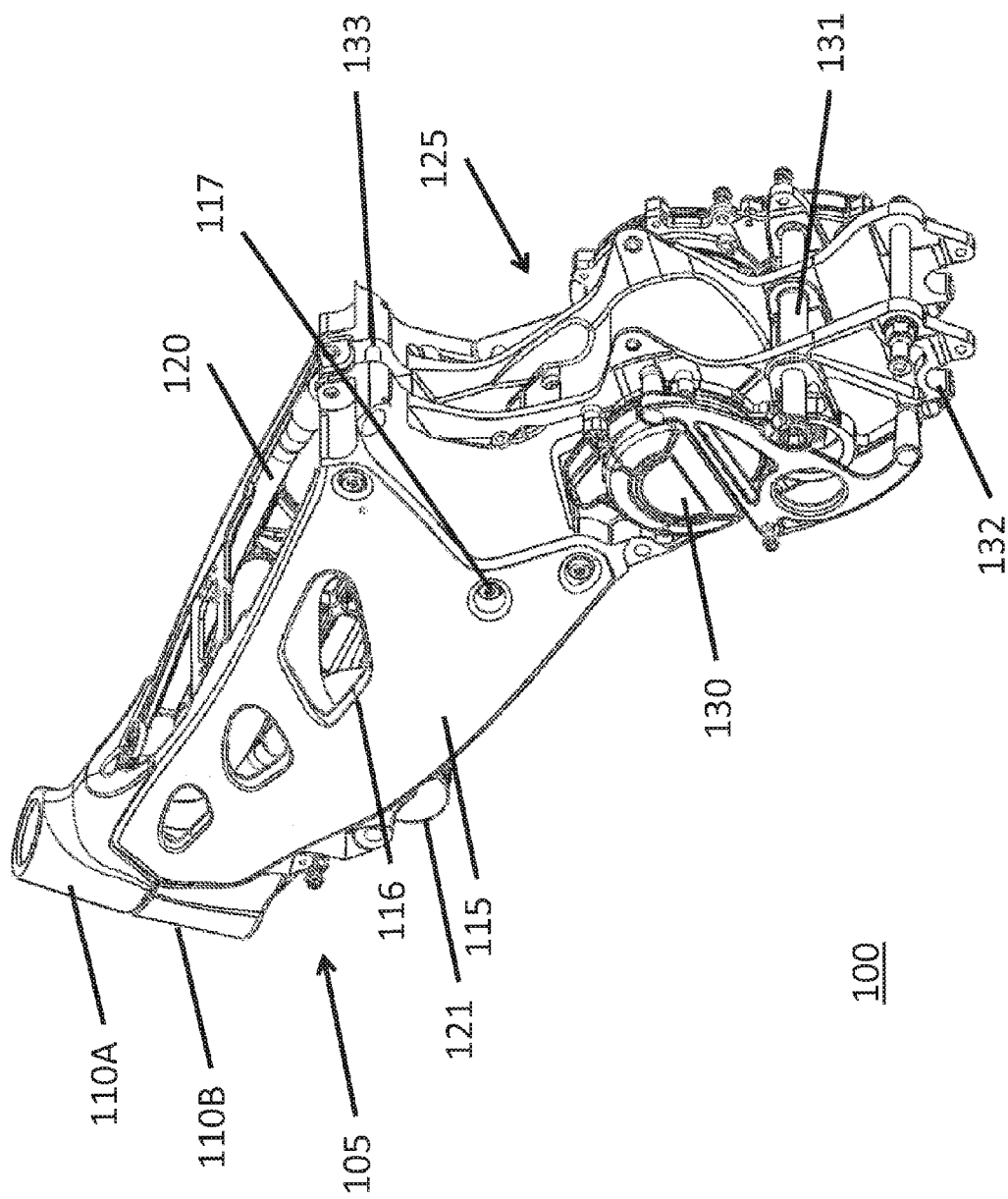
FIG. 1 is a motorcycle chassis according to one embodiment.

FIG. 1 is a motorcycle chassis according to one embodiment. The motorcycle chassis 100 comprises a front bulkhead 105 and a rear bulkhead 125. The front bulkhead 105 and rear bulkhead 125 are the front and rear portions of the motorcycle chassis, respectively. The front bulkhead 105 includes a head tube 110, side panels 115, and one or more coolant tubes 120. The rear bulkhead includes a motor mount 130 and a motor controller mount (not visible in FIG. 1, motor controller mount 301 shown in FIG. 3A and FIG. 4). The head tube 110 is a cylindrical component formed into the motorcycle chassis 100 to interface with a suspension component of the motorcycle such as a front fork (not depicted). In some embodiments, the head tube 110 comprises an upper head tube 110A and a lower head tube 110B. The front fork of the motorcycle connects the front wheel to the chassis 100 and allows the front wheel to rotate and steer the motorcycle. The front fork may comprise suspension components that allow the front wheel to absorb bumps and imperfections in the road. Motorcycle forks are well understood in the related field and thus will not be further described herein.

The side panels 115 extend rearward from the head tube 110 towards the rear bulkhead 125. In some embodiments, the side panels 115 are welded to the other components of the front bulkhead 105. In other embodiments, the side panels 115 may be fixed to the other components of the front bulkhead 105 with bolts or other fastening mechanisms. In some embodiments, the side panels 115 comprise flat panels with additional supports to provide structural rigidity to the front bulkhead 105. In some embodiments, holes 116 are formed in the side panels 115. The holes 116 may serve the purpose of reducing the overall mass of the motorcycle chassis 100. The holes 116 may be drilled into the side panels 115 or the side panels 115 may be formed to include the holes 116. As will be further described below, the side panels 115 are configured to function as a heat sink for transferring heat from a coolant fluid to the side panels 116. In some embodiments, the side panels 115 are mounted to the rear bulkhead 125 via fasteners 117 such as bolts.

One or more coolant tubes 120 are connected to the inner face of the side panels 115, in some embodiments. The coolant tubes 120 are welded to the inner face of the side panels 115 in some embodiments. In other embodiments, the coolant tubes 120 are fixed to the side panels 115 via a fastening mechanism suitable for pipes such as welding or clamps. The coolant tubes 120 are pipes that allow coolant liquid (e.g., water or antifreeze) to flow through freely. In some embodiments, the coolant tubes 120 have a circular cross section. In other embodiments, the coolant tubes 120 may have a square, ridged, or other cross section. The cross section of the coolant tubes 120 may vary in order to increase the efficiency at which the coolant tubes 120 can transfer heat from a coolant fluid to the side panels 115 of the motorcycle chassis 100. That is, the diameter of the coolant tubes 120 may vary along the length of the coolant tubes 120. Alternatively, the diameter of the coolant tubes 120 may be consistent along the length of the coolant tubes 120. The coolant tubes 120 are made of any material that has a high thermal conductivity such that the coolant tubes 120 can transfer the heat from the coolant fluid to the side panels 115. For example, the coolant tubes 120 are made of aluminum or copper. In other embodiments, the coolant tubes 120 may be made of titanium, carbon fiber, or any other material with a high thermal conductivity. In some embodiments, the front bulkhead 105 also comprises a coolant pump 121 which circulates coolant fluid through the coolant tubes 120.

The rear bulkhead 125 houses an electric motor and a motor controller that controls operation of the electric motor, in some embodiments. The electric motor is fixed to the rear bulkhead 125 and is housed inside the motor mount 130 (depicted in FIG. 2). The motor controller is fixed to the rear bulkhead 125 on the controller mount 301 (depicted in FIG. 3A and FIG. 4). In some embodiments, the rear bulkhead 125 is formed to add rigidity and structural integrity to the motorcycle chassis 100. In some embodiments, the rear bulkhead 125 is fixed to the front bulkhead 105 via fasteners 117 such as bolts. In other embodiments, the rear bulkhead 125 is welded to the front bulkhead 105.

In some embodiments, the rear bulkhead 125 also comprises a swingarm mount 131 to allow a swingarm of a motorcycle to be attached to the rear bulkhead 125. The swingarm of a motorcycle may comprise suspension components that allow the rear wheel of a motorcycle to absorb bumps and imperfections in the road. The rear bulkhead 125 may also comprise a skid frame mount 132 to allow a skid frame of a motorcycle to be mounted to the rear bulkhead 125. A motorcycle skid frame protects vital components of a motorcycle chassis and drivetrain. In some embodiments, the skid frame mount 132 may allow the skid frame to pivot relative to the rear bulkhead, allowing for easier access to various components mounted within the front bulkhead 105 and rear bulkhead 125. In some embodiments, the rear bulkhead 125 may also comprise a rear shock mount 133 to allow a rear shock to be mounted to the rear bulkhead 125. The rear shock may be mounted to both the swingarm and rear bulkhead 125 to allow the rear wheel of the motorcycle to absorb bumps and imperfections in the road. In some embodiments, the rear bulkhead 125 is formed to include the different mounts such as the swingarm mount 131, the skidframe mount 132, and the rear shock mount 133. Alternatively, the mounts are welded onto the rear bulkhead 125.

In some embodiments, the motorcycle chassis 100 and its various components are made of an aluminum alloy. In other embodiments, the motorcycle chassis 100 may be made from various other metals, such as steel or titanium. In some embodiments, the motorcycle chassis 100 is constructed of a material that has a high heat capacity, in order to enable the motorcycle chassis to absorb as much of the generated heat as possible.

Figure 2:
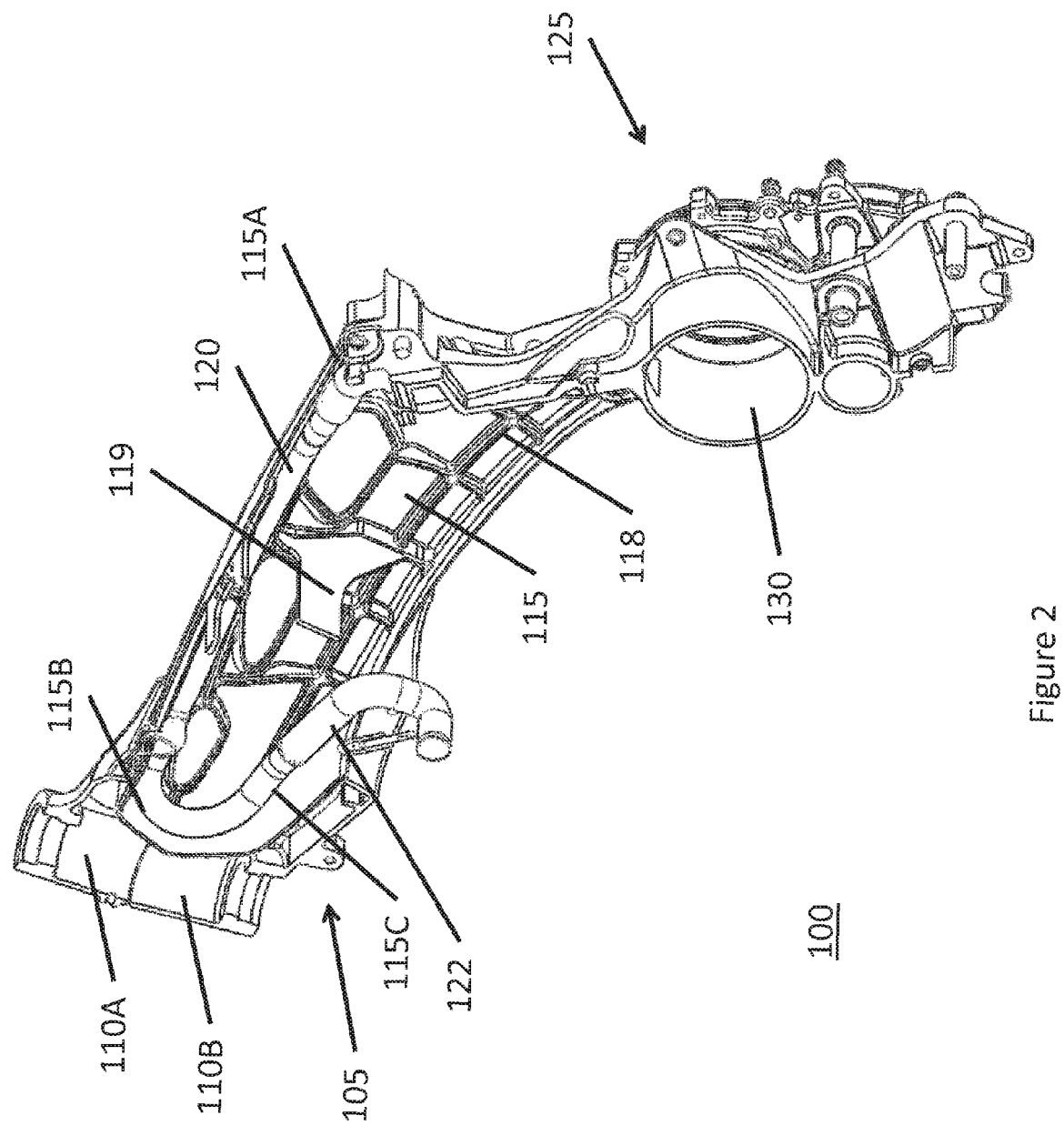
FIG. 2 is a cutaway view of the motorcycle chassis illustrating an integrated coolant tube according to one embodiment.

FIG. 2 is a cutaway view of the motorcycle chassis depicted in FIG. 1 according to one embodiment. In particular, FIG. 2 illustrates a detailed view of the integrated coolant tube 120. As shown in FIG. 2, the integrated coolant tube 120 extends and curves along the inner surface of the side panels 115. In some embodiments, the coolant tube 120 is shaped in order to maximize the contact area between the coolant tube 120 and different edges of the side panels 115. In some embodiments, the coolant tube 120 is in contact with the top edge 115A, front edge 115B, and front lower edge 115C of the side panels 115. The integrated coolant tube 120 is in contact with different edges of the side panels 115 to dissipate the heat from the coolant fluid flowing through the integrated coolant tube 120 to the motorcycle chassis 100 that functions as a heat sink. As described with respect to FIG. 3B and FIG. 3C, the coolant tube 120 is welded to the side panels 115 in some embodiments. The coolant tube may be welded at multiple positions along the side panels 115. In other embodiments, the coolant tube 120 may be attached via other methods to the side panels 115 to facilitate heat transfer between the coolant tube and the side panel 115. In some embodiments, the coolant tube 120 may be connected to the coolant pump 121 (depicted in FIG. 1) by a flexible connector 122. The flexible connector 122 is connected to one end of the coolant tube 120 and connects the coolant tube 120 to the coolant pump 121 to allow coolant liquid to flow between the coolant tube 120 and the coolant pump 121. The flexible connector 122 may be composed of a flexible material. Examples of the flexible connector 122 are a rubber hose or a metal flex pipe.

In some embodiments, the side panels 115 may also comprise reinforcing ribs 118 that add rigidity to the structure of the side panels 115. The ribs 118 are flat panels that protrude substantially perpendicularly from the side panel 115 and extend approximately 1 inch or less from the surface of the side panel 115. As shown in FIG. 2, the reinforcing ribs 118 are positioned in a grid like structure such where a rib positioned in a first direction intersects with a rib positioned in a second direction. In some embodiments, the ribs 118 are machined from the same piece of material as the side panel 115. In other embodiments, the ribs 118 are individual components that are welded to the side panel 115. In some embodiments, there may be two or more ribs 118 that extend along varying directions.

In some embodiments, the side panels 115 also comprise a crossbar 119. The crossbar 119 is a flat panel that protrudes substantially perpendicularly from the side panel 115. In some embodiments, the left side panel 115 and the right side panel 115 each comprise a crossbar 119, and the two crossbars 119 are joined in the middle of the front bulkhead. In other embodiments, the crossbar 119 is a single piece that extends from the left side panel 115 to the right side panel 115. In some embodiments, the crossbar 119 is welded to the side panels 115. In other embodiments, the crossbar 119 is machined directly from the side panel 115. The crossbar 119 further adds rigidity to the side panels 115 and connects the left and right side panels together. In some embodiments, the ribs 118 and crossbar 119 are made of an aluminum alloy. In other embodiments, the ribs 118 and crossbar 119 may be made from various other metals, such as steel or titanium.

Figure 3A:
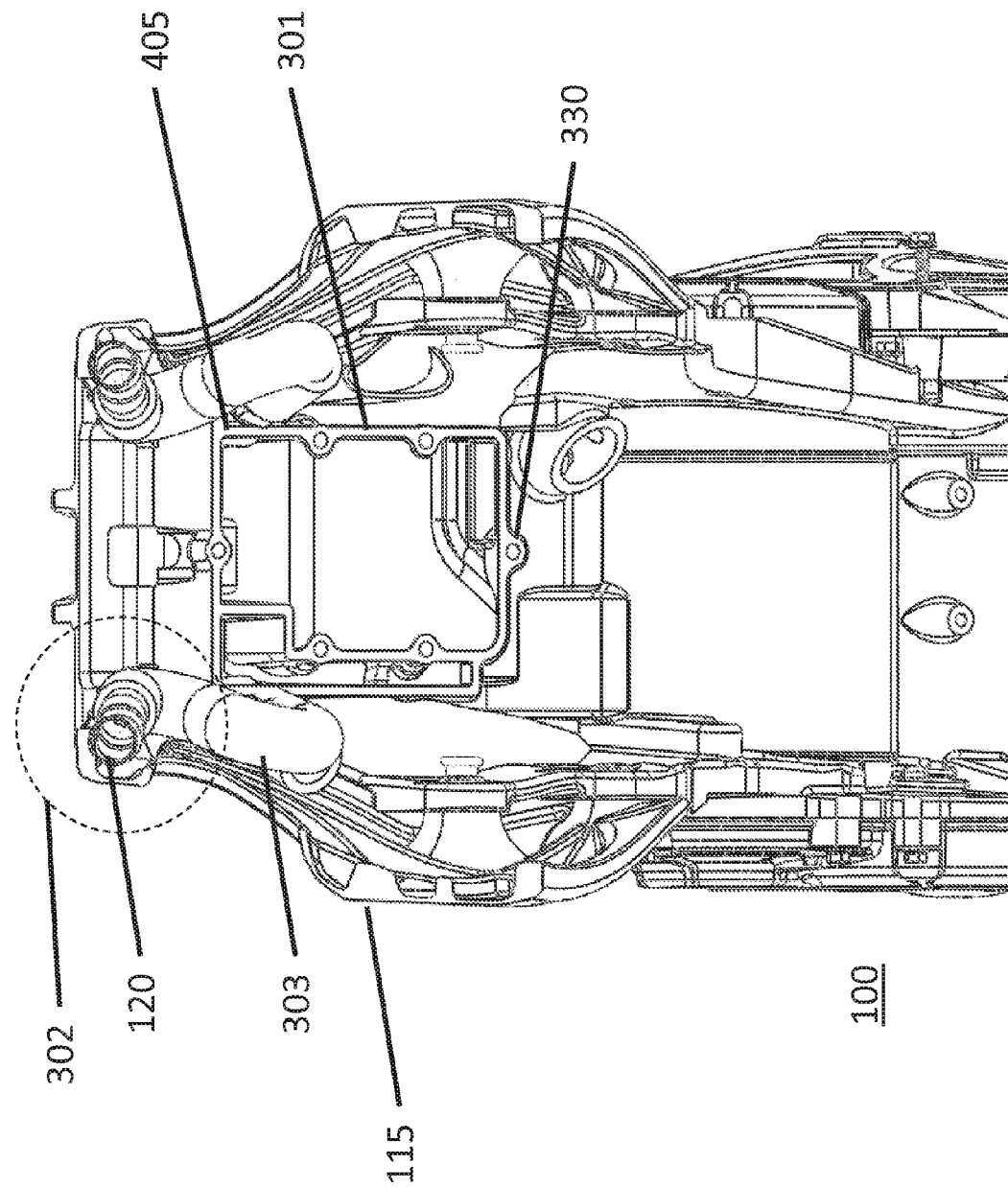
FIG. 3A is a cross sectional view of the motorcycle chassis with the integrated coolant tube according to one embodiment.

FIG. 3A is a cross sectional view of the motorcycle chassis with integrated coolant tube according to one embodiment. The cross sectional view shown in FIG. 3A illustrates the motorcycle chassis 100 from the forward end with the head tube 110. The side panels 115, coolant tubes 120, and rear bulkhead 125 are visible. The coolant tubes 120 are shaped such that the contact area between the coolant tubes 120 and the side panels 115 is maximized, as described in FIG. 2. In some embodiments, the coolant tubes 120 are connected to the inlet port 415 and outlet port 420 (further described in FIG. 4) via a flexible connector 303.

The motorcycle chassis 100 further comprises a controller mount 301, to which a motor controller housing 602 (further described in FIG. 6) is attached. In some embodiments, the controller mount 301 is formed into the rear bulkhead 125. The motor controller mount 301 may comprise a mounting surface 405 (further described in FIG. 4), an interior cavity 410, and fastening locations 330. In some embodiments, the mounting surface 405 is a substantially flat machined surface that mates with the motor controller housing 602. The mounting surface 405 may create a seal with the motor controller housing 602 such that a fluid, such as coolant fluid, may flow through or be contained between the motor controller mount 301 and the motor controller housing 602. In other embodiments, the mounting surface 405 may have a raised lip or incorporate a gasket to provide a liquid-tight seal. The interior cavity 410 creates a space in-between the motor controller mount 301 and motor controller housing 602 for the fluid to flow through or be contained in. In some embodiments, the interior cavity 410 is cast into the rear bulkhead 125. In other embodiments, the interior cavity is machined or otherwise formed into the rear bulkhead 125. In some embodiments, the fastening locations 330 comprise holes formed into the rear bulkhead 125 such that the motor controller housing 602 may be bolted to the motor controller mount 301 using fasteners inserted in the holes. In some embodiments, there are six fastening locations 330. In other embodiments, there may be more or fewer multiples of fastening locations 330. The circular section 302 is further described below with reference to FIG. 3B and FIG. 3C.

Figure 3C:
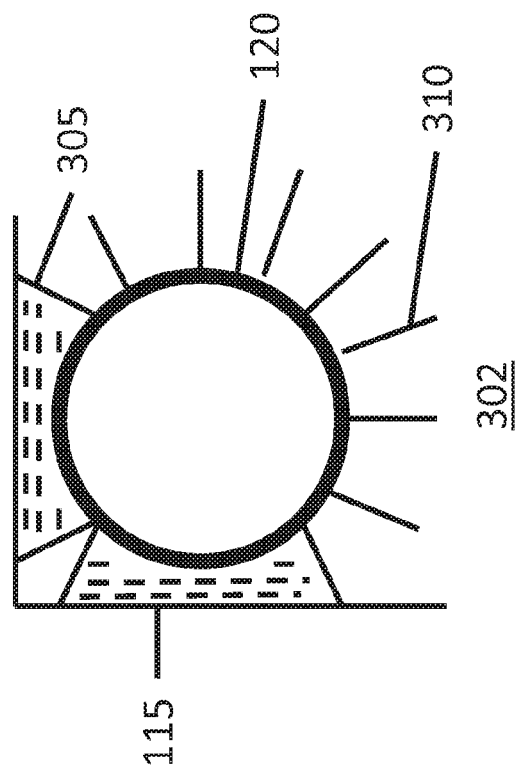
FIG. 3C is a cross sectional view of an integrated coolant tube fixed to a side panel of the motorcycle chassis according to one embodiment.
Figure 3B:
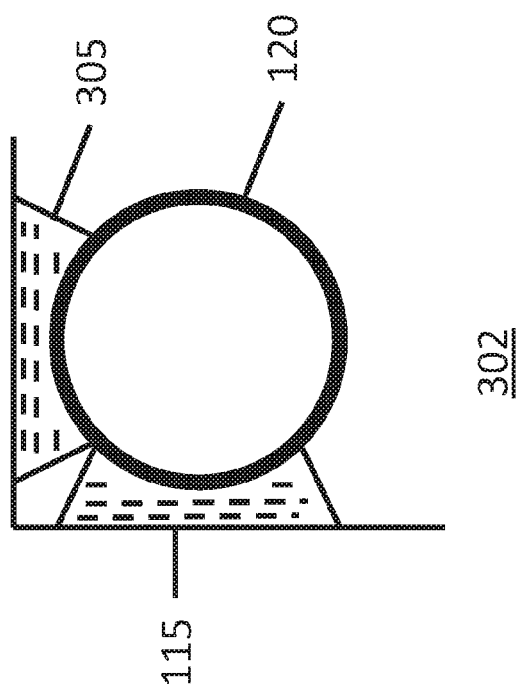
FIG. 3B is a cross sectional view of the integrated coolant tube fixed to a side panel of the motorcycle chassis according to one embodiment.

FIG. 3B is a cross sectional view of a coolant tube 120 fixed to a side panel 115 of the motorcycle chassis 100. FIG. 3B depicts the circular area 302 in FIG. 3A. The coolant tube 120 is fixed to the side panel 115 via welds 305. A coolant fluid, such as water or some other coolant fluid, flows through the coolant tube 120. In order to maximize heat transfer from the coolant tube to the side panel 115, the surface area of the welds 305 contacting both the side panel 115 and the coolant tube 120 is maximized. That is, a threshold amount of the surface of the coolant tube 120 is in contact with the side panel 115 via welds 305. In some embodiments, the threshold amount of the surface of the coolant tube 120 is at least one quarter of the surface of the coolant tube 120. In other embodiments, the threshold amount is more or less than one quarter. The coolant tube 120 may comprise a circular cross section as depicted in FIG. 3B. In other embodiments, the coolant tube 120 may comprise different cross sectional shapes in order to increase the amount of heat transferred to the side panels 115. In other embodiments, the coolant tube 120 may be attached to the side panel 115 via a different method other than a weld.

FIG. 3C is a cross sectional view of an alternative embodiment of the coolant tube 120 fixed to the side panel 115 of the motorcycle chassis 100. The coolant tube 120 is fixed to the side panel 115 via welds 305 as described above with reference to FIG. 3B. However, the embodiment of the coolant tube 120 depicted in FIG. 3C further comprises fins 310. In some embodiments, the fins 310 are planar projections that extend substantially perpendicularly from the surface of the coolant tube 120. In some embodiments, the fins 310 extend a maximum of 1 inch from the surface of the coolant tube 120. In some embodiments, coolant tube 120 comprises seven fins 310. The coolant tube 120 may comprise more or fewer fins in other embodiments. In some embodiments, the fins 310 extend down the entire length of the coolant tube 120. In other embodiments, the fins 310 may only be present on certain sections of the coolant tube 120. The fins 310 may allow some of the heat from the fluid circulating through the coolant tube 120 to be more efficiently transferred to the surrounding atmosphere via convection. In some embodiments, the fins 310 are welded to the coolant tube 120. In other embodiments, the coolant tube 120 and fins 310 are formed from a continuous piece of material, such as by extrusion. In some embodiments, the fins 310 are made of the same material as the coolant tube 120, such as aluminum or copper.

Figure 4:
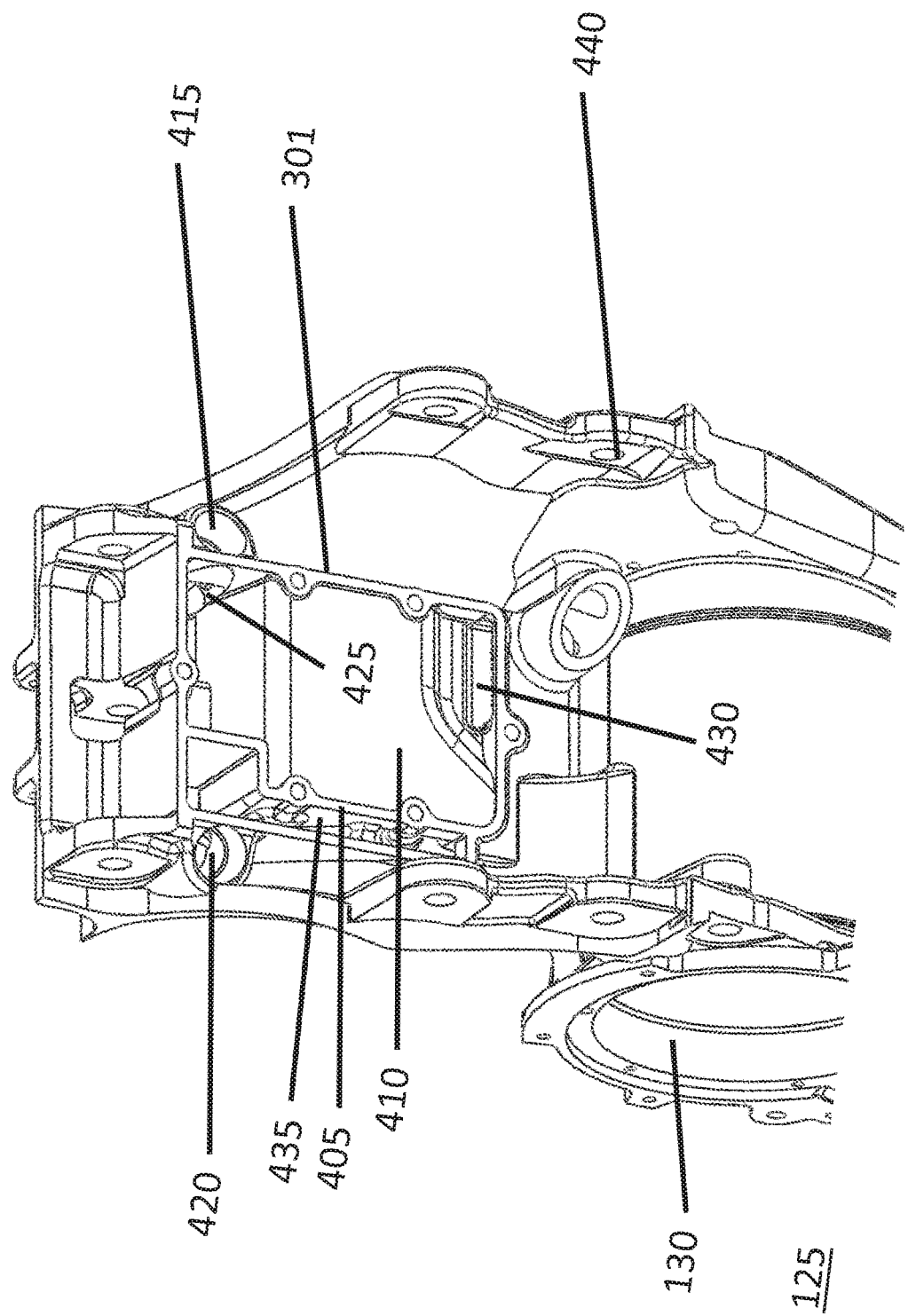
FIG. 4 is a rear bulkhead of the motorcycle chassis according to one embodiment.

FIG. 4 is a rear bulkhead 125 of the motorcycle chassis 100 according to one embodiment. The rear bulkhead 125 comprises a motor mount 130, a controller mount 301, an inlet port 415, and an outlet port 420 in one embodiment. The motor mount 130 comprises a cylindrical volume formed inside the rear bulkhead 125. An electric motor (described below with reference to FIG. 5) is inserted and fixed inside the motor mount 130. The motor controller mount 301 comprises a mounting surface 405 to which a motor controller housing is fixed. The mounting surface 405 is substantially flat. In some embodiments, an interior cavity 410 of the mounting surface 405 is recessed into the rear bulkhead 125 to allow fluid to flow between the motor controller and the rear bulkhead 125. The inlet port 415 allows the coolant fluid to flow from the coolant tubes 120 into the rear bulkhead 125 via a coolant inlet well 425 that extends from the inlet port 415. In one embodiment, the coolant inlet well 425 is a hole that is cast in the rear bulkhead 125 to allow coolant from the coolant inlet port 415 to enter the motor controller mount 301. The coolant fluid then flows past the motor controller housing via the recessed interior cavity 410. As the fluid flows passes the motor controller, heat is transferred from the motor controller to the coolant fluid. The coolant fluid exits the motor controller mount 301 via a coolant outlet well 430 which extends to the motor mount 130. Similar to the coolant inlet well 425, the coolant outlet well 430 is a hole that is cast in the rear bulkhead 125 to allow coolant fluid to exit the controller mount 301. The coolant fluid then circulates around the electric motor (further described with reference to FIG. 5), and then exits the rear bulkhead 125 via the outlet port 420 into another coolant tube 120. The coolant fluid flows to the outlet port 420 from the electric motor through a coolant return path 435 (further described below with reference to FIG. 6B). In some embodiments the rear bulkhead 125 also comprises mounting holes 440 to allow the rear bulkhead 125 to be mounted to the front bulkhead 105 via fasteners 117 (depicted in FIG. 1).

Figure 5:
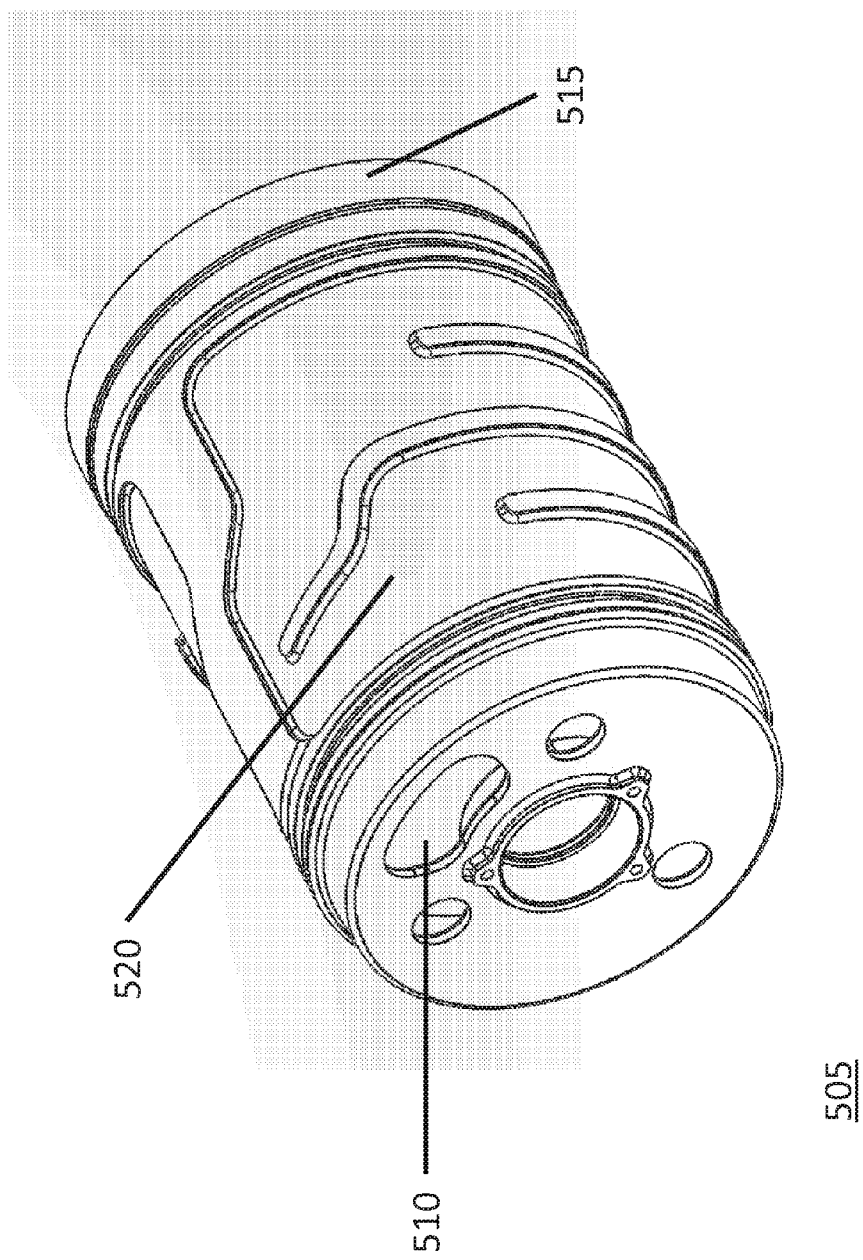
FIG. 5 is an electric motor assembly according to one embodiment.

FIG. 5 is an electric motor assembly according to one embodiment. The electric motor assembly 505 comprises an electric motor 510 and a motor housing 515. Electric motors are well understood in the related field and are not described further herein. The motor housing 515 further comprises grooves 520 in some embodiments. The grooves 520 provide a path for the coolant fluid to flow around the electric motor 510. Heat generated by the electric motor 510 is transferred to the coolant fluid, and the coolant fluid flows through the rear bulkhead 125, exits the rear bulkhead 125 via the outlet port 420, and flows into the coolant tubes 120 as described above with reference to FIG. 4. In some embodiments, the grooves 520 distribute the coolant flow into multiple (e.g., 4) individual channels around the motor housing 515. In other embodiments, the grooves 520 are shaped differently to optimize the flow of the coolant fluid around the motor housing 515. In some embodiments, the grooves 520 are machined into the motor housing 515. In some embodiments, the motor housing 515 is made from aluminum or other suitable material.

Figure 6A:
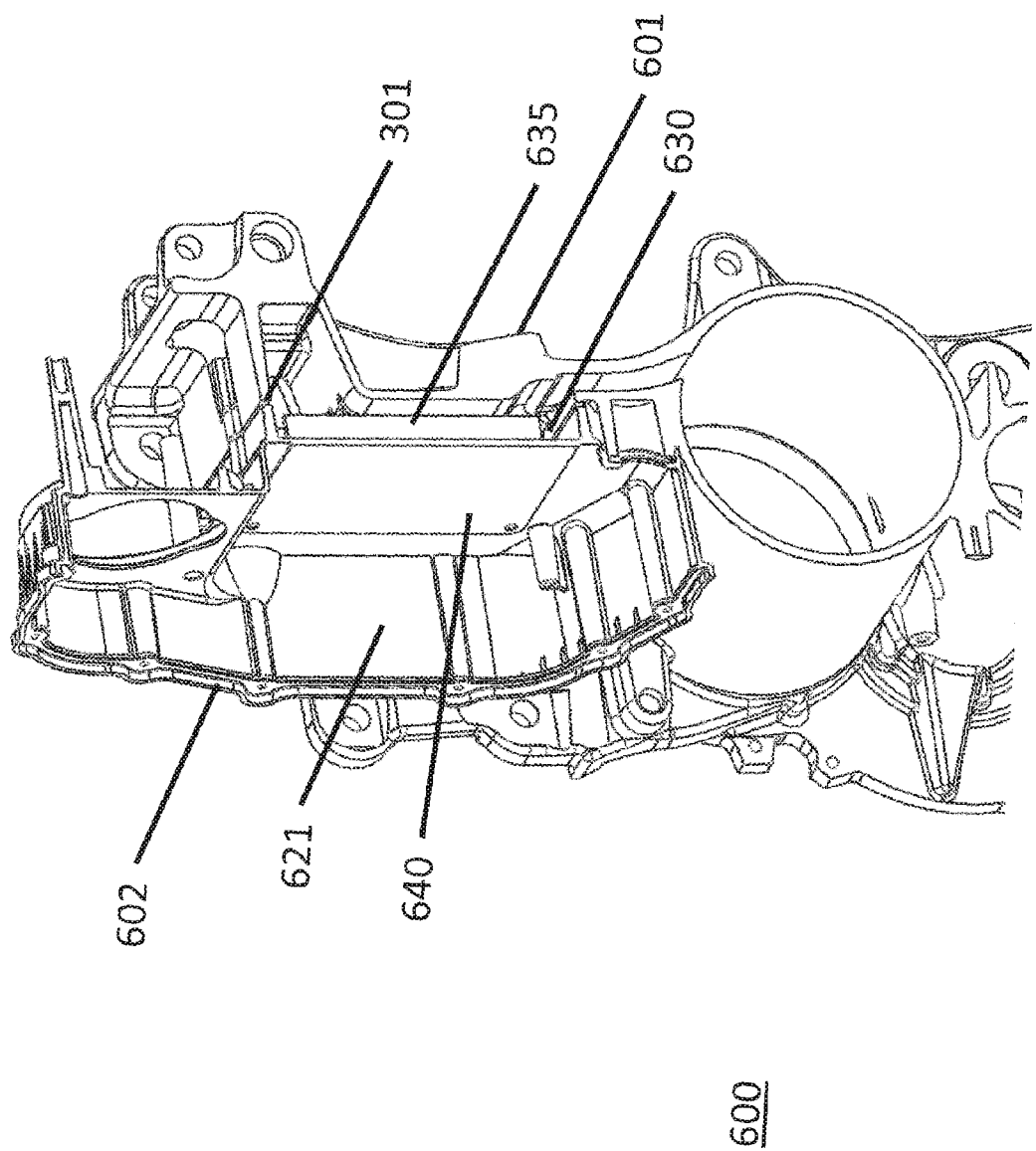
FIGS. 6A and 6B are a cross sectional view of a rear bulkhead of the motorcycle chassis with an integrated motor controller housing according to one embodiment.

FIG. 6A is a cross sectional view of a rear bulkhead assembly of a motorcycle chassis with an integrated motor controller housing according to one embodiment. The rear bulkhead assembly 600 comprises a rear bulkhead 601 and a motor controller housing 602. The rear bulkhead 601 is similar to the rear bulkhead 125 described above with reference to FIG. 4. The rear bulkhead 601 comprises the controller mount 301 described above with reference to FIG. 4. On one side, the motor controller housing 602 further comprises an interior cavity 621 in which a motor controller (also referred to as the inverter) is mounted. On the other side, the motor controller housing 602 further comprises a coolant flow region 630 with coolant guide fins 635. The coolant flow region 630 may also be considered a coolant flow cavity. In some embodiments, the coolant fluid that enters the rear bulkhead through the inlet port 415 (shown in FIG. 4) flows through the coolant flow region 630 and is guided by the coolant guide fins 635. The coolant guide fins 635 are formed into the motor controller housing 602 by machining or as part of the casting process. The coolant guide fins 635 guide the coolant fluid to extract as much heat as possible from the motor controller housing 602 and are further discussed in reference to FIG. 7A. In some embodiments, a motor controller is mounted in the interior cavity 621 such that the motor controller is flush against the dividing surface 640 between the interior cavity 621 and the coolant flow region 630. As shown in FIG. 7A, the coolant flow region 630 is a cavity on the other side of the motor controller housing 602 opposite to the interior cavity 621. This provides for the most efficient heat transfer from the motor controller to the coolant fluid. In other embodiments, the motor controller is mounted in a different configuration which maximizes heat transfer from the motor controller to the coolant fluid.

Figure 6B:
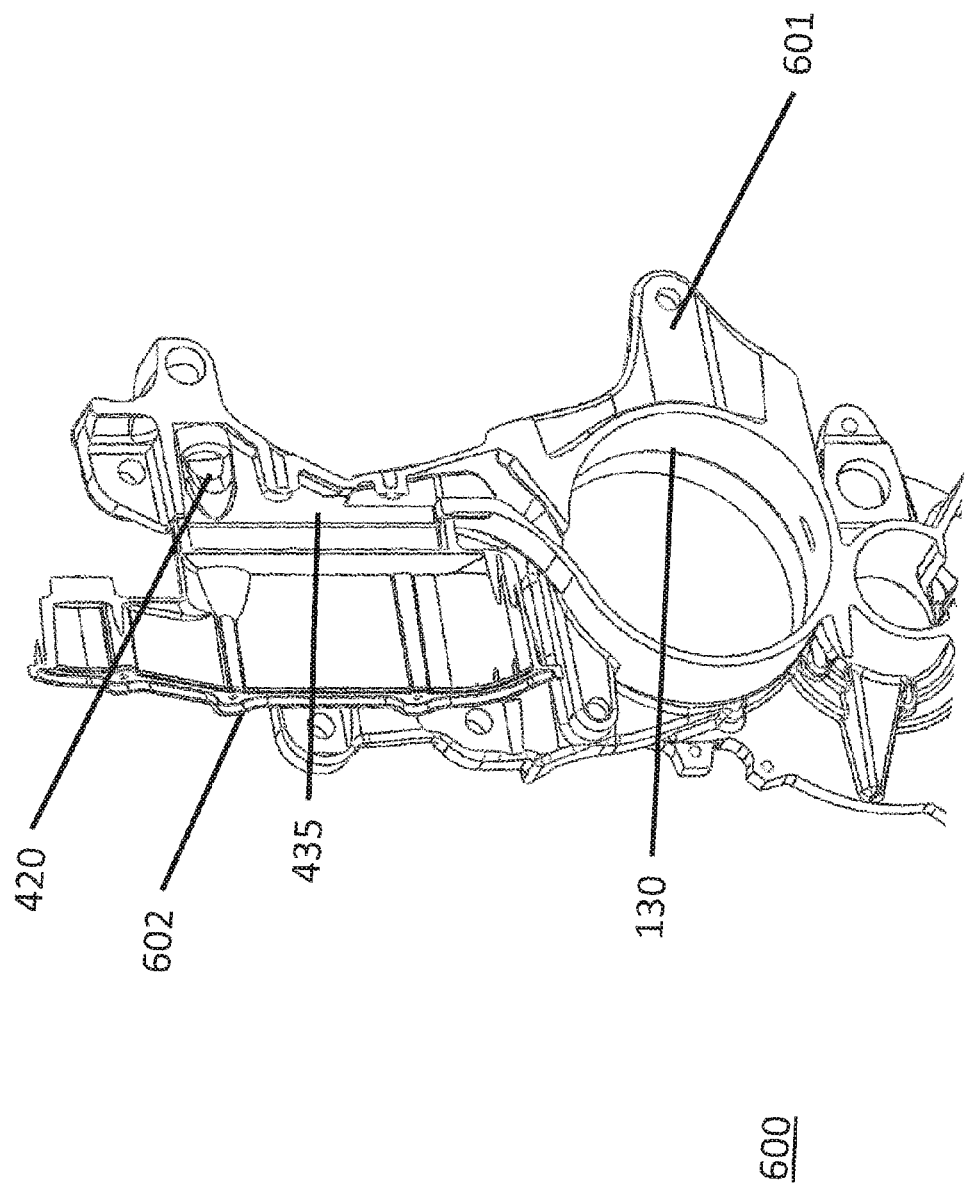

FIG. 6B is a different cross sectional view of the rear bulkhead assembly 600 described above with reference to FIG. 6A. The rear bulkhead assembly 600 comprises a rear bulkhead 601 and a motor controller housing 602. The rear bulkhead 601 comprises a coolant return path 435, described above with reference to FIG. 4, which allows the coolant fluid to flow from the electric motor (housed in the electric motor housing 130) back up to the outlet port 420. In some embodiments, the coolant return path 435 is cast, machined, or otherwise formed into the rear bulkhead 601.

Figure 7B:
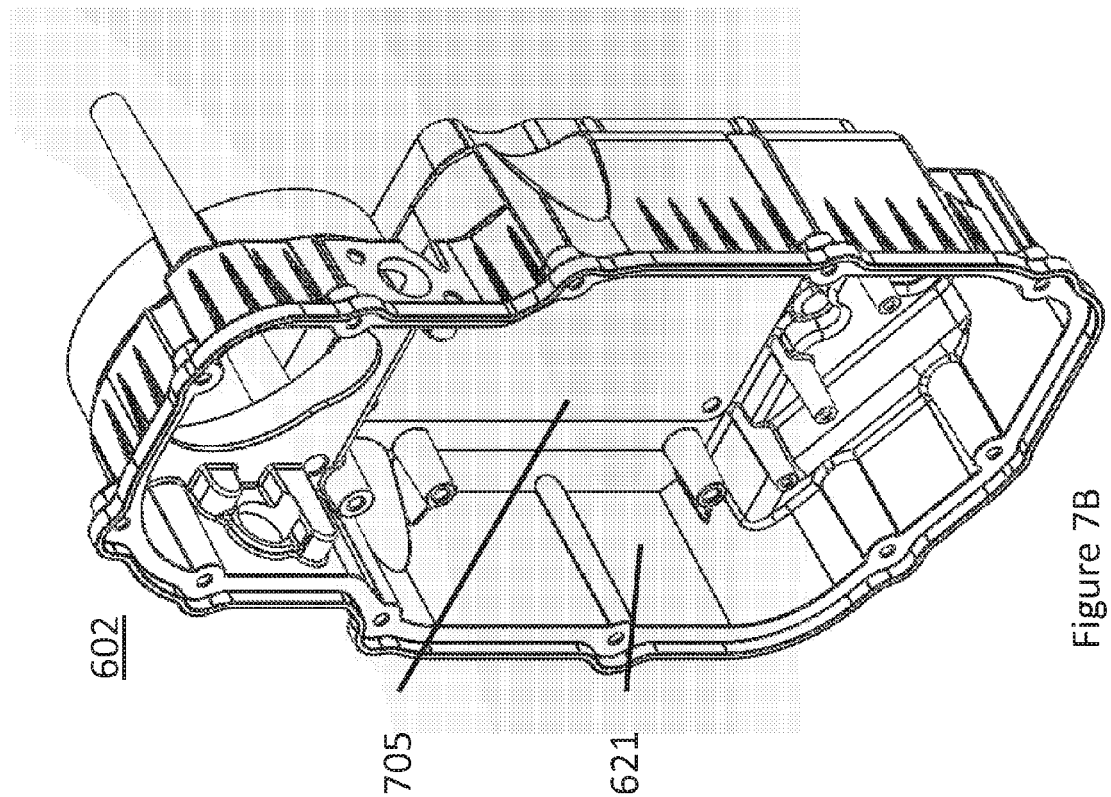
FIGS. 7A and 7B illustrate a motor controller housing according to one embodiment.
Figure 7A:
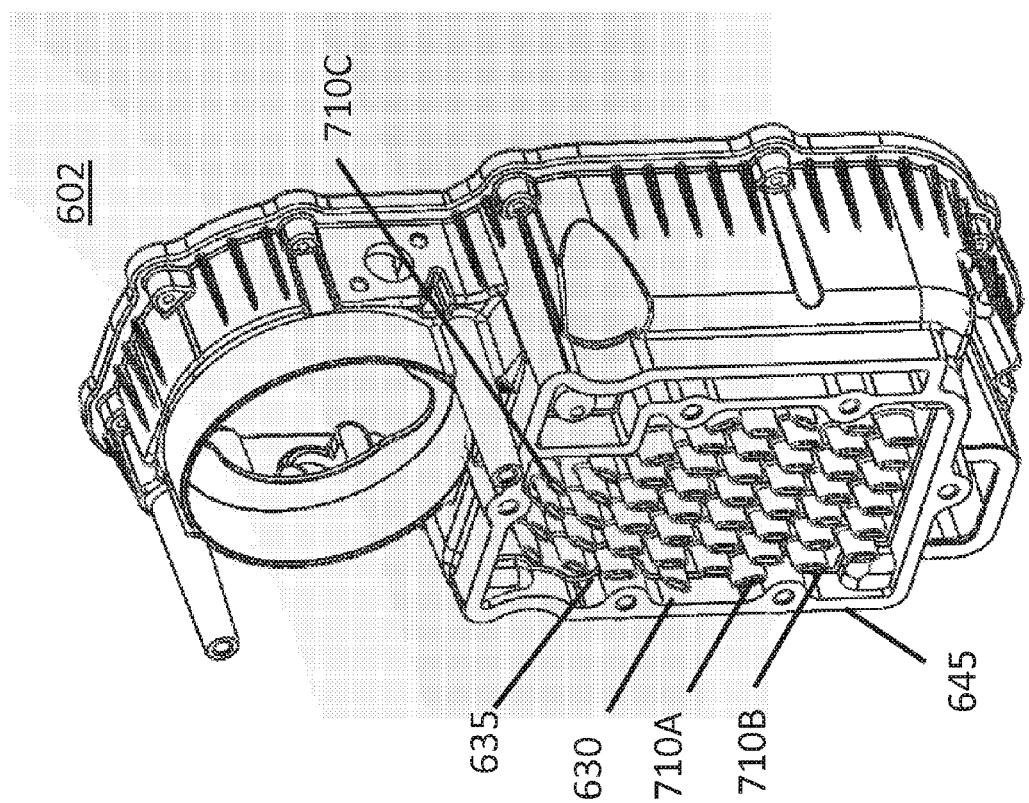

FIG. 7A and FIG. 7B illustrate a motor controller housing according to one embodiment. In some embodiments, the motor controller housing depicted in FIG. 7A and FIG. 7B are similar to the motor controller housing 602 depicted in FIG. 6A. As described above with reference to FIG. 6A, the motor controller housing 602 comprises an interior cavity 621 on one side, and a coolant flow region 630 with coolant guide fins 635 on the other side. In some embodiments, the coolant guide fins 635 are arranged to encourage turbulent flow of the coolant fluid. Turbulent flow allows for more effective heat transfer than laminar flow by allowing the fluid to break through a boundary layer that may be present near the surface of the motor controller housing 602. In some embodiments, each of the coolant guide fins is elliptical in shape. In some embodiments, one or more of the coolant guide fins 710A are angled to the left to varying degrees (i.e., a first direction), one or more of the coolant guide fins 710B are vertically oriented (i.e., a second direction), and one or more of the coolant guide fins 710C are angled to the right to varying degrees (i.e., a third direction). Though not depicted, some of the coolant guide fins 710 may be angled horizontally. Thus, coolant guide fins 635 include fins orientated in different directions with respect to each other. The angle, position, and size of each of the fins may be changed independently to vary the turbulence introduced into the flow of the coolant fluid. The motor controller housing 602 also includes a mounting surface 645 that mounts to the mounting surface 405 of the motor controller mount 301. In the depicted embodiment, a motor controller (or inverter) is mounted in the interior cavity 621 to the flat surface 705. In some embodiments, the motor controller is shaped to maximize the contact area between the motor controller and the flat surface 705. This maximizes the amount of heat transfer between the motor controller and the controller housing 602. The controller housing 602 then transfers the heat to the coolant fluid which flows through the coolant flow region 630. In some embodiments, the controller housing 602 is formed by casting and is made from aluminum. In other embodiments, the controller housing 602 is made of various other thermally conductive materials.

Referring back to FIG. 2, the motorcycle chassis 100 functions primarily as a heat sink, in some embodiments. The thermal mass (or heat capacity) of the motorcycle chassis 100 is large enough to absorb the amount of heat generated by the electric motor and various other components of the electric vehicle. Allowing the motorcycle chassis 100 to absorb the generated heat eliminates the heat from the electric motor and various other components of the electric vehicle. The motorcycle chassis 100 dissipates some of the absorbed heat through convection with the surrounding atmosphere. However, the motorcycle chassis 100 is not necessarily optimized for dissipating heat through convection, in some embodiments. Because the amount of heat generated by the electric motor and various components is relatively low, dissipating heat via convection is not necessary.

In some embodiments, a coolant fluid is circulated from the coolant tubes 120 in the front bulkhead 105 through the rear bulkhead 125 and back. The coolant fluid flows into the inlet port 415 past the controller mount 301, through the grooves 520 of the motor housing 515, and then exits the rear bulkhead 125 through the outlet port 420. In some embodiments, a coolant pump 121 circulates the coolant fluid. In some embodiments, the coolant fluid is water. In other embodiments, the coolant fluid is an automotive coolant fluid used in typical automotive applications.

In contrast, a typical vehicle powered by an internal combustion engine (ICE) generates a greater amount of waste heat, and the thermal mass of the chassis is not great enough to absorb the generated waste heat. Therefore, an ICE-powered vehicle often utilizes a radiator system to more efficiently dissipate the generated waste heat. The radiator setup typically circulates a coolant fluid around the ICE such that heat from the ICE is transferred to the coolant fluid via conduction. Then, the coolant fluid is circulated through a radiator, which allows the coolant fluid to efficiently dissipate the absorbed heat to the atmosphere via convection.

It is advantageous to eliminate the need for a radiator system from a vehicle and to use the chassis of a vehicle as a heat sink because it eliminates a possible point of failure from the vehicle. A radiator is susceptible to leakage or failure and can be fragile due to the nature of construction. On the other hand, using a motorcycle chassis is a more robust solution and reduces the complexity of the overall vehicle. It is further advantageous to use the chassis of the vehicle as a heat sink because it is allows an existing member of the vehicle to serve an additional purpose. Therefore, by not adding an additional component required for coolant, the overall mass of the vehicle is reduced, resulting in increased efficiency and more favorable handling characteristics.

We claim:

1. A motorcycle chassis comprising:
    a head tube configured to house a suspension component;
    a plurality of side panels that each include a first end and a second end, the first end of each side panel connected to the head tube and the second end of each side panel extending rearward from the head tube, and each side panel including an outer surface and an inner surface where the inner surfaces of the plurality of side panels face each other; and
    a coolant tube distinct from the plurality of side panels and the coolant tube attached to the inner surface of at least one of the plurality of side panels, the coolant tube extending along the inner surface of the side panel and thermally contacting the inner surface of the side panel, the coolant tube configured to carry coolant to and from an electric motor of the motorcycle chassis.

2. The motorcycle chassis of claim 1, wherein the coolant tube is attached to the inner surface of the side panel via a plurality of welds along the inner surface of the side panel.

3. The chassis of claim 1, wherein a diameter of the coolant tube varies along a length of the coolant tube.

4. The motorcycle chassis of claim 1, wherein the plurality of side panels include at least one crossbar located between the first ends and second ends the plurality of side panels, the crossbar protruding from the inner surfaces of the plurality of side panels and connecting together the plurality of side panels.

5. The motorcycle chassis of claim 1, wherein the inner surface of the side panel includes a plurality of edges and the coolant tube is in thermal contact with the plurality of edges.

6. The motorcycle chassis of claim 1, further comprising:
    a flexible connector that connects an end of the coolant tube to a coolant pump that pumps the coolant fluid through the coolant tube.

7. The motorcycle chassis of claim 1, wherein the inner surface of the side panel includes reinforcing ribs that extends substantially perpendicular from the inner surface of the side panel.

8. The motorcycle chassis of claim 7, wherein a first rib of the reinforcing ribs is positioned in a first direction and a second rib of the reinforcing ribs is positioned in a second direction that is distinct from the first direction and intersects with the first rib.

9. The motorcycle chassis of claim 1, wherein the side panel comprises one or more holes formed in the side panel.

10. The motorcycle chassis of claim 1, wherein the coolant tube is attached to the inner surfaces of the plurality of side panels.

11. The motorcycle chassis of claim 1, further comprising:
    a rear bulkhead attached to the second ends of the plurality of side panels, the rear bulkhead including:
        a motor mount formed in the rear bulkhead and configured to house the electric motor within the rear bulkhead;
        a motor controller mount formed in the rear bulkhead and configured to connect a motor controller housing to the rear bulkhead; and
        a swingarm mount connecting a swingarm of the motorcycle to the rear bulkhead.

12. The motorcycle chassis of claim 11, wherein the motor controller mount comprises:
    a substantially flat mounting surface including a plurality of mounting holes;
    a recessed portion of the motor controller mount that extends from the mounting surface into the rear bulkhead;
    a first coolant well configured to allow coolant fluid from the coolant tube to flow into the recessed portion of the controller mount; and
    a second coolant well configured to allow the coolant fluid to exit the recessed portion of the motor controller mount to the motor mount.

13. The motorcycle chassis of claim 11, further comprising a motor controller housing including:
    an inner cavity formed on a first side of the motor controller housing, the inner cavity housing a motor controller that controls operation of the electric motor;
    a substantially flat mounting surface formed on a second side of the motor controller housing, the mounting surface coupling the motor controller housing to the mounting surface of the controller mount using fasteners inserted in the plurality of mounting holes; and
    a coolant flow cavity that extends from the mounting surface on the second side of the motor controller housing into the motor controller housing, the coolant flow cavity including a plurality of coolant guide fins that guide the coolant fluid between the coolant flow cavity of the motor controller housing and the recessed portion of the controller mount to transfer heat from the motor controller to the coolant fluid.

14. The motorcycle chassis of claim 11, wherein the rear bulkhead further includes:
    an inlet port configured to connect to one end of the coolant tube; and
    an outlet port configured to connect to another end of coolant tube.

15. The motorcycle chassis of claim 1, wherein the coolant tube comprises a circular cross section.

16. The motorcycle chassis of claim 1, wherein the coolant tube comprises a square cross section.

17. A motorcycle chassis of a motorcycle comprising:
    a head tube configured to house a suspension component;
    a plurality of side panels that each include a first end and a second end, the first end of each side panel connected to the head tube and the second end of each side panel extending rearward from the head tube, and each side panel including an outer surface and an inner surface where the inner surfaces of the plurality of side panels face each other; and a rear bulkhead attached to the second ends of the plurality of side panels, the rear bulkhead including:

a motor mount formed in the rear bulkhead and configured to house an electric motor within the rear bulkhead;

a motor controller mount formed in the rear bulkhead and configured to connect a motor controller housing to the rear bulkhead; and a swingarm mount connecting a swingarm of the motorcycle to the rear bulkhead.

18. The motorcycle chassis of claim 17, wherein the motor controller mount comprises:

a substantially flat mounting surface including a plurality of mounting holes;

a recessed portion of the motor controller mount that extends from the mounting surface into the rear bulkhead;

a first coolant well configured to allow coolant fluid from a coolant tube to flow into the recessed portion of the controller mount; and a second coolant well configured to allow the coolant fluid to exit the recessed portion of the motor controller mount to the motor mount.

19. The motorcycle chassis of claim 17, further comprising a motor controller housing including:

an inner cavity formed on a first side of the motor controller housing, the inner cavity housing a motor controller that controls operation of the electric motor;

a substantially flat mounting surface formed on a second side of the motor controller housing, the mounting surface coupling the motor controller housing to the mounting surface of the controller mount using fasteners inserted in the plurality of mounting holes; and a coolant flow cavity that extends from the mounting surface on the second side of the motor controller housing into the motor controller housing, the coolant flow cavity including a plurality of coolant guide fins that guide the coolant fluid between the coolant flow cavity of the motor controller housing and the recessed portion of the controller mount to transfer heat from the motor controller to the coolant fluid.

20. The motorcycle chassis of claim 17, wherein the rear bulkhead further includes:

an inlet port configured to connect to one end of the coolant tube; and an outlet port configured to connect to another end of coolant tube.

* * * * *